United States Patent
Suzuki et al.

(10) Patent No.: US 11,074,932 B1
(45) Date of Patent: Jul. 27, 2021

(54) SUSPENSION ASSEMBLY WITH LIMITER AND DISK DRIVE

(71) Applicants: Kabushiki Kaisha Toshiba, Tokyo (JP); Toshiba Electronic Devices & Storage Corporation, Tokyo (JP)

(72) Inventors: Yasuo Suzuki, Fujisawa Kanagawa (JP); Yasutaka Sasaki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/988,107

(22) Filed: Aug. 7, 2020

(30) Foreign Application Priority Data

Jan. 17, 2020 (JP) .............................. JP2020-005792

(51) Int. Cl.
| | |
|---|---|
| *G11B 5/54* | (2006.01) |
| *G11B 5/012* | (2006.01) |
| *G11B 5/48* | (2006.01) |
| *G11B 21/22* | (2006.01) |
| *G11B 21/12* | (2006.01) |

(52) U.S. Cl.
CPC ................ *G11B 5/54* (2013.01); *G11B 5/012* (2013.01); *G11B 5/483* (2015.09); *G11B 5/4833* (2013.01); *G11B 21/12* (2013.01); *G11B 21/22* (2013.01)

(58) Field of Classification Search
None
See application file for complete search history.

(56) References Cited

U.S. PATENT DOCUMENTS

| | | | | |
|---|---|---|---|---|
| 7,317,595 | B2 | 1/2008 | Tsuchida et al. | |
| 8,179,745 | B2 | 5/2012 | Nakamura et al. | |
| 8,446,695 | B1* | 5/2013 | Ee et al. ............... | G11B 5/4826 360/245.3 |
| 8,593,765 | B2 | 11/2013 | Uematsu et al. | |
| 8,976,491 | B1* | 3/2015 | Chen et al. .......... | G11B 5/4833 360/245.7 |
| 2004/0246625 | A1* | 12/2004 | Tsuchida et al. .... | G11B 5/4833 360/244.2 |
| 2008/0144223 | A1* | 6/2008 | Muraki et al. ....... | G11B 5/4853 360/244.8 |
| 2009/0009911 | A1* | 1/2009 | Yang et al. .......... | G11B 5/4826 360/245.3 |

(Continued)

FOREIGN PATENT DOCUMENTS

JP        2015-41394 A      3/2015

*Primary Examiner* — Craig A. Renner
(74) *Attorney, Agent, or Firm* — White & Case LLP

(57) ABSTRACT

According to one embodiment, a suspension assembly includes a support plate including a distal end portion and a proximal end portion, a wiring member including a gimbal portion and provided on the support plate, and a magnetic head on the gimbal portion. The gimbal portion includes a first welded portion located near the proximal end portion and welded to the support plate, a second welded portion located near the distal end portion and welded to the support plate, a tongue portion between the first welded portion and the second welded portion, supported displaceably to the support plate, and on which the magnetic head is mounted, and a limiter extending from the tongue portion toward the second welded portion.

5 Claims, 6 Drawing Sheets

(56) References Cited

U.S. PATENT DOCUMENTS

| | | | |
|---|---|---|---|
| 2012/0002322 A1* | 1/2012 | Kikuchi | G11B 5/4826 360/245.9 |
| 2014/0022670 A1* | 1/2014 | Takikawa et al. | G11B 5/4826 360/234.4 |
| 2014/0022674 A1* | 1/2014 | Takikawa et al. | G11B 5/483 360/244.5 |
| 2014/0085755 A1* | 3/2014 | Hanya et al. | G11B 5/4826 360/244.5 |
| 2015/0055253 A1 | 2/2015 | Takikawa et al. | |
| 2019/0108853 A1* | 4/2019 | Yamada | G11B 5/4833 |

* cited by examiner

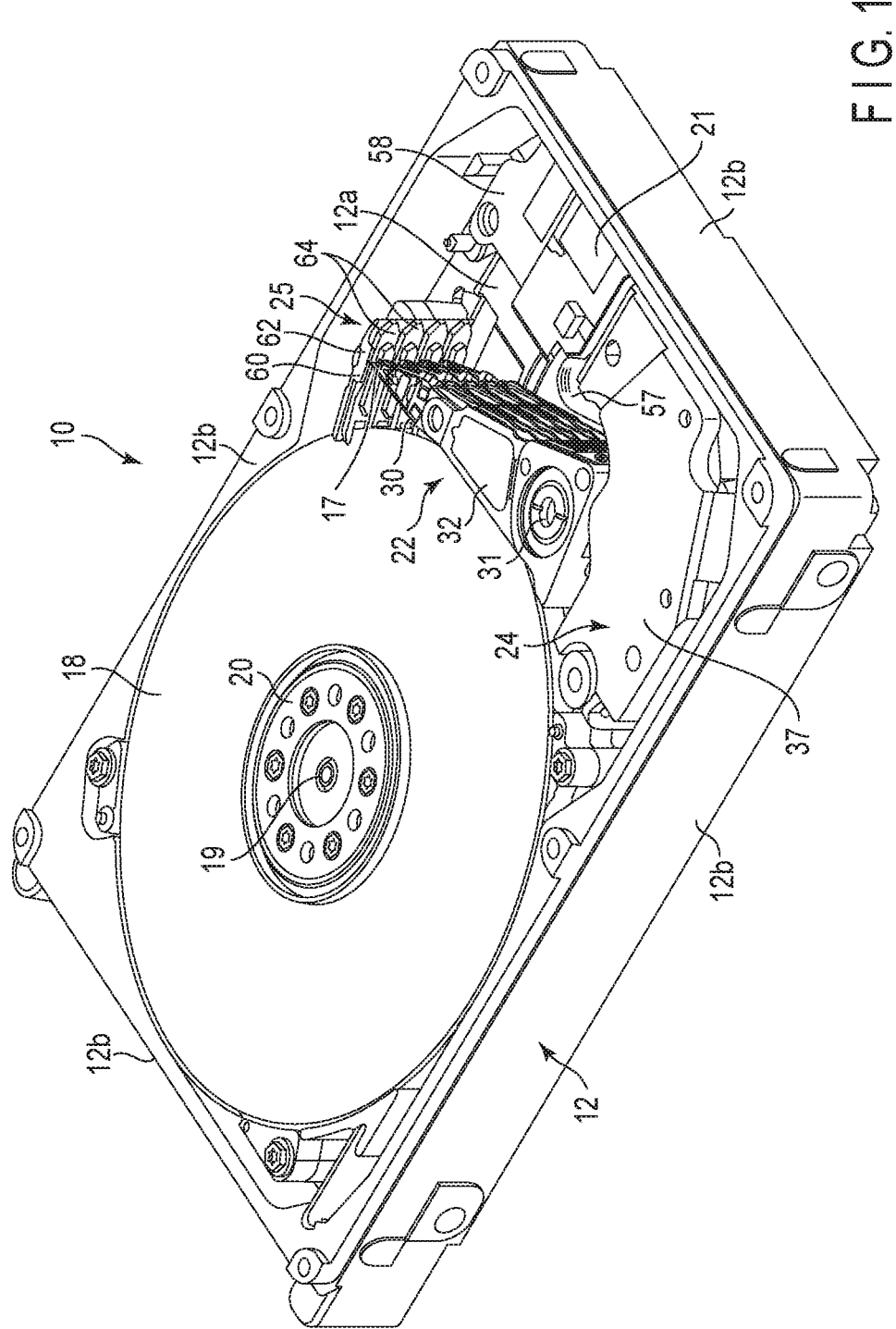
F I G. 1

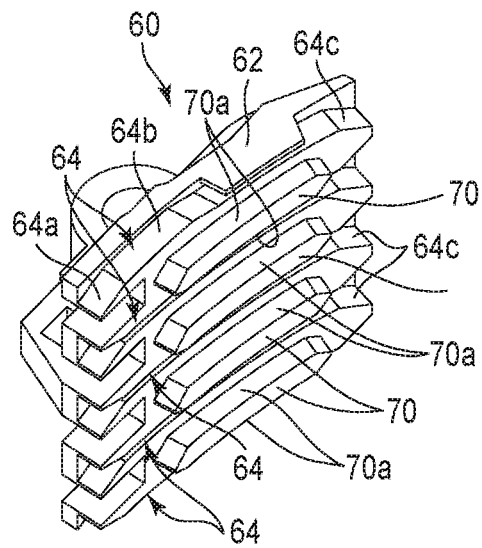
FIG. 6
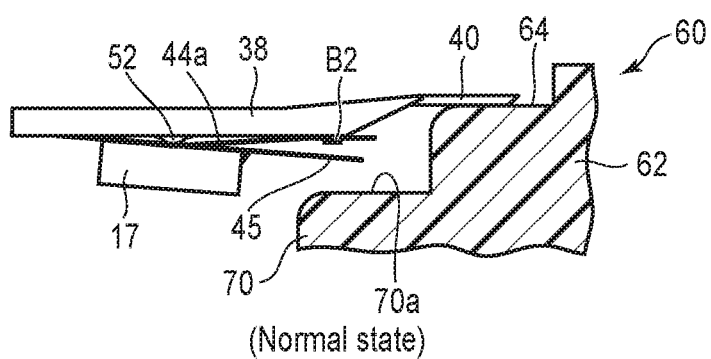
FIG. 7A (Normal state)
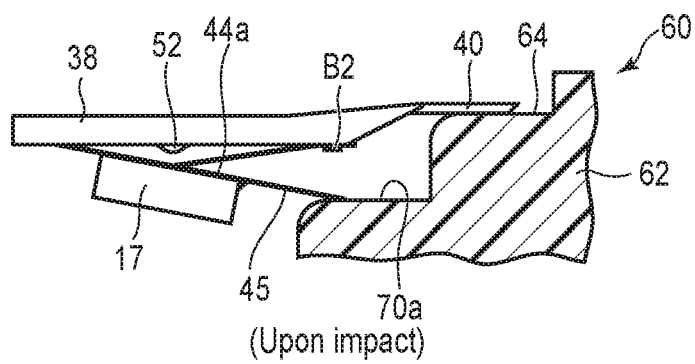
FIG. 7B (Upon impact)

US 11,074,932 B1

SUSPENSION ASSEMBLY WITH LIMITER AND DISK DRIVE

CROSS-REFERENCE TO RELATED APPLICATIONS

This application is based upon and claims the benefit of priority from Japanese Patent Application No. 2020-005792, filed Jan. 17, 2020, the entire contents of which are incorporated herein by reference.

FIELD

Embodiments described herein relate to a suspension assembly and a disk drive including the suspension assembly.

BACKGROUND

As a disk drive, for example, a hard disk drive (HDD) comprises a plurality of magnetic disks rotatably arranged in a housing, a plurality of magnetic heads which reads/writes information from/to the magnetic disks, and a head actuator supporting the magnetic heads to be movable relative to the magnetic disks.

The head actuator includes an actuator block that is rotatably supported, and a plurality of head suspension assemblies (may be referred to as head gimbal assemblies) which extend from the actuator block and support the respective magnetic heads at the distal end portions. Each of the head suspension assemblies comprises a base plate whose one end is fixed to an arm, a load beam that extends from the base plate, a tab that extends from a distal end of the load beam, and a flexure (wiring member) provided on the load beam and the base plate. The flexure includes a gimbal portion that is displaceable, and the magnetic head is supported by the gimbal portion.

In the disk drive as described above, the flexure includes the gimbal portion that is displaceable, and therefore, when a large external impact is applied to the disk drive, the gimbal portion may be excessively deformed and the gimbal portion or the magnetic head may be damaged.

BRIEF DESCRIPTION OF THE DRAWINGS

FIG. 1 is a perspective view of a hard disk drive (HDD) according to an embodiment with a top cover omitted.

FIG. 6 is a perspective view of a ramp of the HDD.

FIG. 7A is a schematic side view of an engagement state between a distal end portion of the head suspension assembly and the ramp in a normal state.

FIG. 7B is a schematic side view of an engagement state between the distal end portion of the head suspension assembly and the ramp when an external force is applied.

DETAILED DESCRIPTION

Figure 2:
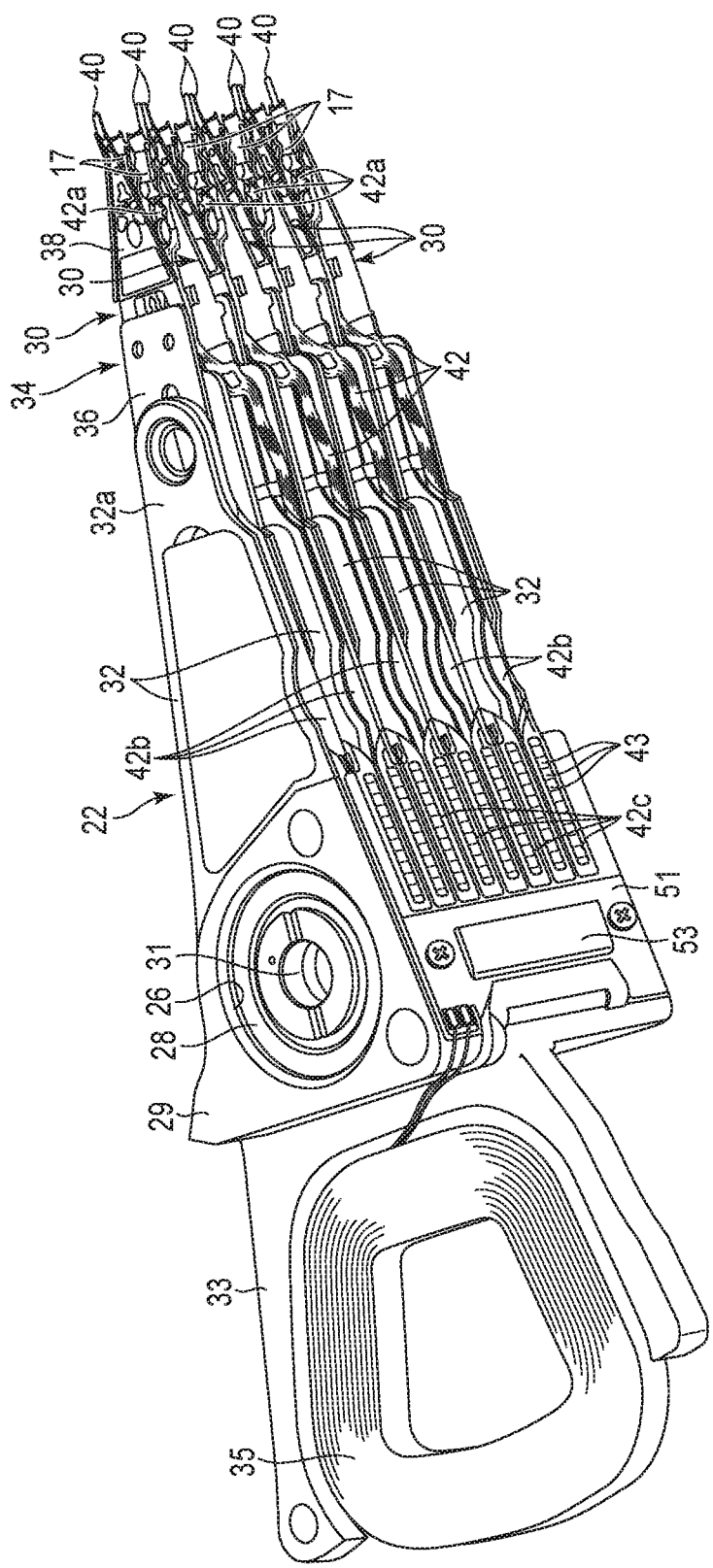
FIG. 2 is a perspective view of an actuator assembly of the HDD.

Various embodiments will be described hereinafter with reference to the accompanying drawings. In general, according to one embodiment, a suspension assembly comprises: a support plate including a distal end portion and a proximal end portion; a wiring member comprising a gimbal portion and provided on the support plate; and a magnetic head mounted on the gimbal portion. The gimbal portion comprises a first welded portion located near the proximal end portion of the support plate relative to the magnetic head and welded to the support plate, a second welded portion located near the distal end portion of the support plate relative to the magnetic head and welded to the support plate, a tongue portion provided between the first welded portion and the second welded portion and supported displaceably to the support plate, and on which the magnetic head is mounted, and a limiter extending from the tongue portion toward the second welded portion.

Note that the disclosure is just exemplary, and thus appropriate alterations to be conceived by those skilled in the art without departing from the gist of the invention should be rightfully included in the scope of the present invention. In addition, for more clear description, the drawings may schematically illustrate, for example, the width, thickness, or shape of each part in comparison to the actual aspects. However, the drawings are just exemplary and thus do not limit interpretation to the present invention. In addition, in the present specification and each figure, elements similar to those described regarding already given figures are denoted with the same reference signs, and the detailed descriptions thereof may be appropriately omitted.

Embodiment

As a disk drive, a hard disk drive (HDD) according to an embodiment will be described in detail.

FIG. 1 is a perspective view of the HDD according to an embodiment, with a cover removed.

As illustrated, the HDD comprises a rectangular housing 10. The housing 10 comprises a rectangular box-shaped base 12 with an upper surface opened, and a top cover not shown. The base 12 includes a rectangular bottom wall 12a and side walls 12b standing along the peripheral edges of the bottom wall and the base 12 is integrally molded of, for example, aluminum. The top cover is formed of, for example, stainless steel into a shape of a rectangular plate shape and is fixed to the side walls 12b of the base 12 with a plurality of screws.

In the housing 10, a plurality of magnetic disks 18 and a spindle motor 19 are provided, the magnetic disks 18 serving as disk-shaped recording media, the spindle motor 19 supporting and rotating the magnetic disks 18. The spindle motor 19 is arranged on the bottom wall 12a. Each of the magnetic disks 18 includes, for example, a substrate that is formed into a disk shape with a diameter of 95 mm (3.5 inches) and made of a nonmagnetic material, such as glass, and a magnetic recording layer that is formed on an upper surface (first surface) and a lower surface (second surface) of the substrate. The magnetic disks 18 are coaxially fitted to a hub, which is not illustrated, of the spindle motor 19 and further clamped by a clamp spring 20. The magnetic disks 18 are supported to be positioned parallel to the bottom wall 12a of the base 12. The magnetic disks 18 are rotated at a predetermined rotation speed by the spindle motor 19.

In the present embodiment, for example, four magnetic disks 18 are arranged in the housing 10, but the number of the magnetic disks 18 is not limited to this and may be three or less, or five or more.

In the housing 10 are provided a plurality of magnetic heads 17, which write and read information on and from the magnetic disks 18, and an actuator assembly 22, which supports the magnetic heads 17 such as to be movable with respect to the respective 30 magnetic disks 18. In the housing 10 are provided a voice coil motor (VCM) 24 which rotates and positions the actuator assembly 22, a ramped loading mechanism 25 which holds the magnetic heads 17 at respective unloading positions spaced away from the respective 35 magnetic disks 18 when the magnetic heads 17 are moved to the outermost circumferences of the respective magnetic disks 18, and a board unit (FPC unit) 21 on which electronic components such as conversion connectors are mounted.

A printed circuit board (not shown) is fixed by screws to an outer surface of the bottom wall 12a of the base 12. The printed circuit board constitutes a control unit, which controls the operation of the spindle motor 19 and also controls the respective operations of the VCM 24 and the magnetic heads 17 via the board unit 21.

FIG. 2 is a perspective view of the actuator assembly 22. As illustrated, the actuator assembly 22 comprises an actuator block 29 with a through hole 26, a bearing unit (unit bearing) 28 provided in the through hole 26, a plurality of, for example, five arms 32 extending from the actuator block 29, suspension assemblies 30 attached to the corresponding arms 32, and the magnetic heads 17 supported by the respective suspension assemblies 30. The actuator block 29 is rotatably supported by the bearing unit 28 around a support shaft (pivot) 31 stood on the bottom wall 12a.

In the present embodiment, the actuator block 29 and the five arms 32 are integrally formed of aluminum or the like to constitute a so-called E-block. Each of the arms 32 is formed into, for example, an elongated flat plate shape and extends from the actuator block 29 in a direction orthogonal to the support shaft 31. The five arms 32 are spaced in parallel with each other.

The actuator assembly 22 comprises a support frame 33 that extends from the actuator block 29 in a direction opposite to the arms 32. A voice coil 35 partially constituting the VCM 24 is supported by the support frame 33. As illustrated in FIG. 1, the voice coil 35 is positioned between a pair of yokes 37 provided in the base 12. Together with the yokes 37 and a magnet fixed to the either of the yokes 38, the voice coil 35 constitutes the VCM 24.

As illustrated in FIG. 2, the actuator assembly 22 comprises eight suspension assemblies 30 that support the magnetic heads 17, and these suspension assemblies 30 are attached to distal end portions 32a of the respective arms 32. The suspension assemblies 30 include up head suspension assemblies supporting magnetic heads 17 upward and down head suspension assemblies supporting magnetic heads 17 downward. The up head suspension assembly and the down head suspension assembly are identical in structure but are disposed mutually upside down.

In the present embodiment, in FIG. 2, a down head suspension assembly 30 is mounted to an uppermost arm 32, and an up head suspension assembly 30 is mounted to a lowermost arm 32. Up head suspension assemblies 30 and down head suspension assemblies 30 are mounted to three intermediate arms 32.

Next, an example of a suspension assembly 30 will be described in detail.

Figure 3:
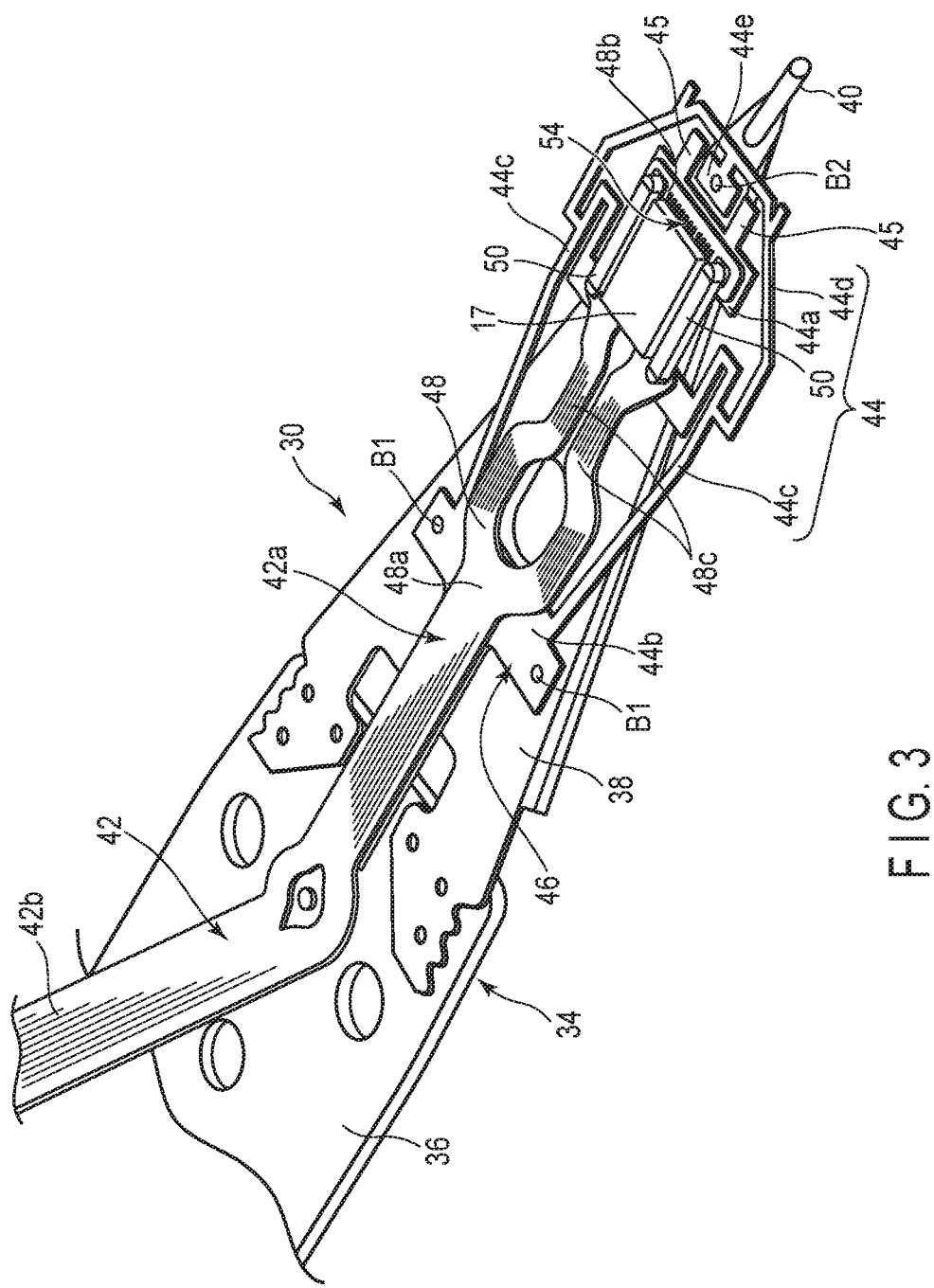
FIG. 3 is a perspective view of a head suspension assembly of the actuator assembly.
Figure 4:
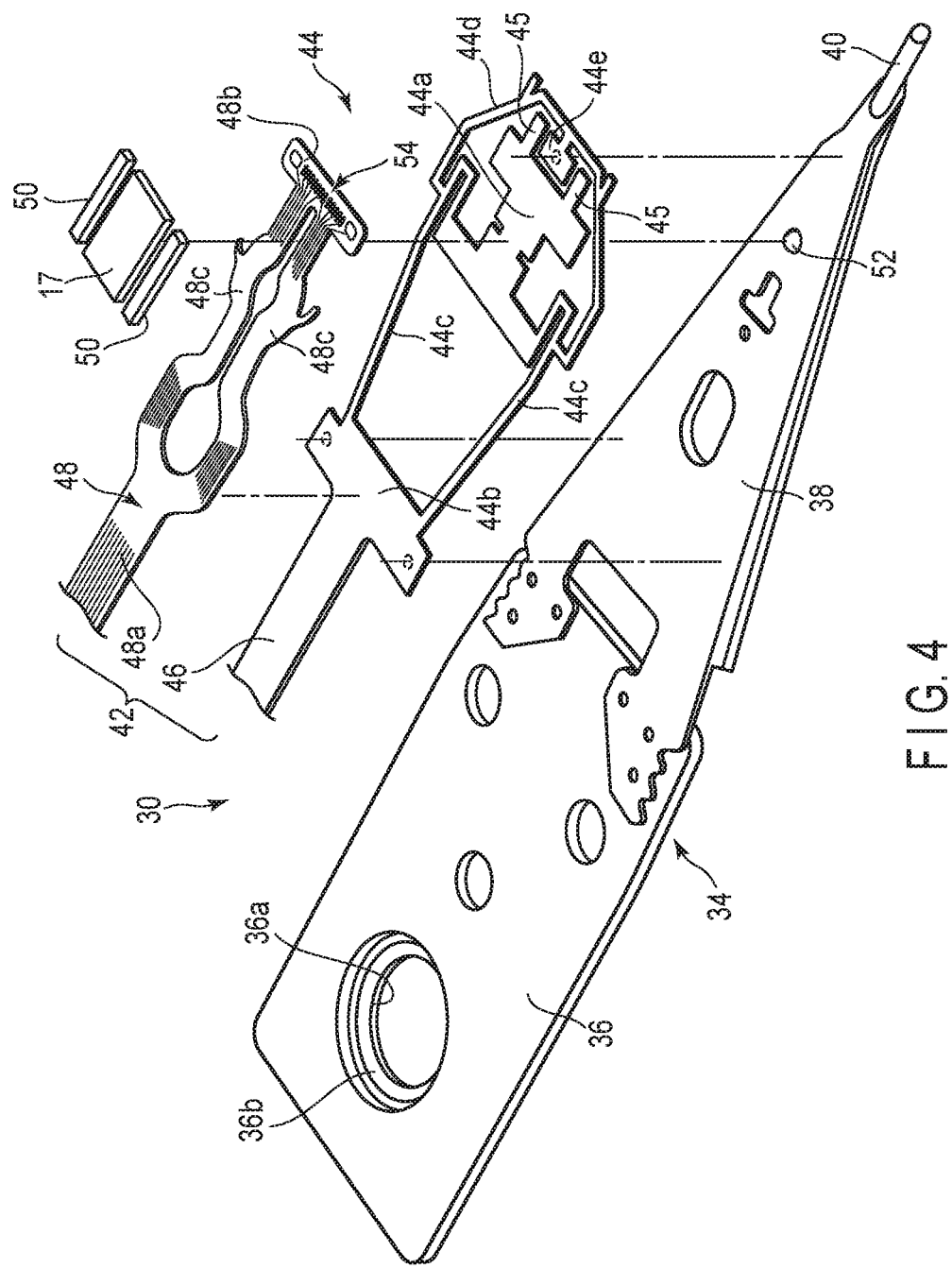
FIG. 4 is an exploded perspective view of the head suspension assembly.
Figure 5:
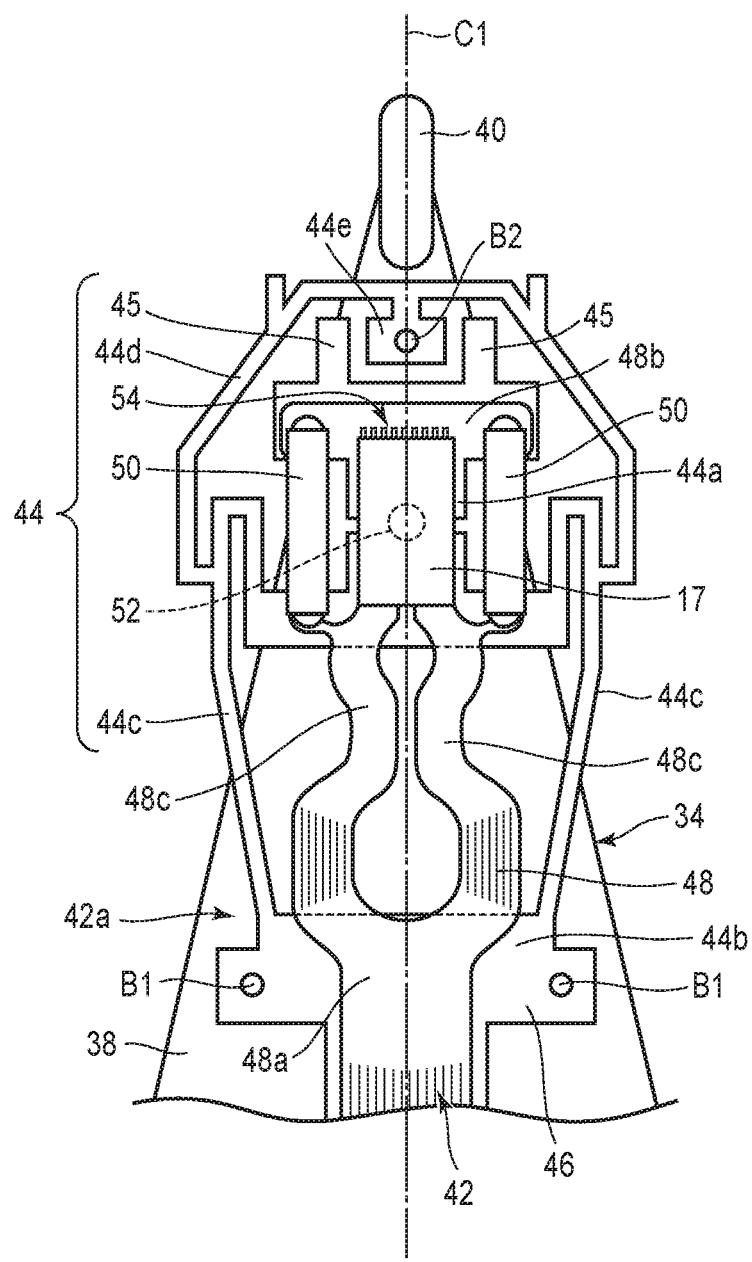
FIG. 5 is a plan view of the head suspension assembly.

FIG. 3 is a perspective view of the suspension assembly, FIG. 4 is an exploded perspective view of the suspension assembly, and FIG. 5 is a plan view of the suspension assembly.

As illustrated in FIGS. 3 and 4, each suspension assembly 30 includes a suspension 34 that extends from an arm 32, and a magnetic head 17 is attached to a distal end portion of the suspension 34. Note that the magnetic head 17 and the suspension assembly 30 supporting the magnetic head 17 are collectively referred to as a head suspension assembly.

The suspension 34 functioning as a support plate includes a base plate 36 of rectangular shape that is made of a metal plate having a thickness of several hundred micrometers and a load beam 38 of leaf spring shape that is made of a metal plate having a thickness of several ten micrometers. The load beam 38 has a distal end portion that constitutes a distal end portion of the support plate, and a proximal end portion of the load beam 38 and the base plate 36 constitute a proximal end portion of the support plate. The proximal end portion of the load beam 38 is arranged to overlay on a distal end portion of the base plate 36 and is fixed to the base plate 36 by being welded at a plurality of positions. The proximal end portion of the load beam 38 has a width which is substantially equal to the width of the base plate 36. A tab 40 of rod shape is protrudingly provided at the distal end of the load beam 38.

The base plate 36 has a proximal end portion that includes a circular opening 36a and an annular projection 36b located around the opening 36a. The base plate 36 is fastened to the distal end portion 32a of the arm 32 by fitting the projection 36b to a circular swage hole, not illustrated, that is formed in a swaged seat surface of the arm 32 and swaging the projection 36b. The proximal end of the base plate 36 may be fixed to the distal end portion 32a of the arm 32 by laser welding, spot welding, or adhesion.

The suspension assembly 30 comprises a flexure (wiring member) 42 of elongated strip shape, configured to transmit a recording/reading signal and a drive signal for a piezoelectric element, and a pair of piezoelectric elements (e.g., PZT elements) 50 mounted on the flexure 42. As illustrated in FIGS. 2 and 3, the flexure 42 includes a distal end side portion 42a that is arranged on the load beam 38 and the base plate 36, a proximal end side portion 42b that extends outward from a side edge of the base plate 36 and extends to the actuator block 29 along a side edge of the arm 32, and a connection end portion 42c that extends from an extending end of the proximal end side portion 42b. The connection end portion 42c includes a plurality of connection pads 43 arranged side by side. These connection pads 43 are electrically joined to connection terminals of a wiring board 51 installed in the actuator block 29.

As illustrated in FIGS. 3, 4, and 5, a distal end portion of the flexure 42 is provided on the distal end portion of the load beam 38 and constitutes a gimbal portion 44 that functions as a resilient support portion. The magnetic head 17 is placed and fixed on the gimbal portion 44 and supported by the load beam 38 via the gimbal portion 44. The pair of piezoelectric elements 50 as drive elements are mounted on the gimbal portion 44 and arranged on both sides of the magnetic head 17 in the width direction of the magnetic head 15.

The flexure 42 comprises a thin metal plate (metal plate) 46, such as stainless steel, that serves as a base, and a laminated member (FPC) 48 of stripped shape that is pasted or fixed on the thin metal plate 46, and the flexure 42 is formed into an elongated laminated plate. The laminated member 48 includes a base insulating layer (first insulating layer) that is mostly fixed to the thin metal plate 46, a conductive layer (wiring pattern) formed on the base insulating layer and constituting a plurality of signal wiring lines and drive wiring lines, and a plurality of connection pads (electrode pads), and a cover insulating layer (second insulating layer) formed on the base insulating layer so as to cover the conductive layer. As the conductive layer, for example, copper foil can be used. In the distal end side portion 42a of the flexure 42, the thin metal plate 46 is pasted on the surfaces of the load beam 38 and the base plate 36 or spot-welded thereto at a plurality of welded points. In an example, the thin metal plate 46 includes two welded points (first welded portions) B1 where the thin metal plate 46 is welded to the proximal end portion of the load beam 38 and one welded point (second welded portion) B2 where the thin metal plate 46 is welded to the distal end portion of the load beam 38. In other words, the thin metal plate 46 is welded to the load beam 38 at least at two positions, that is, the welded points B1 located on a leading end side of the head 17 and the welded point B2 located on a trailing end side of the head 17.

In the gimbal portion 44, the thin metal plate 46 integrally includes a tongue portion (support portion) 44a of substantially rectangular shape, a proximal end portion (proximal end plate portion) 44b of substantially rectangular shape, a pair of outriggers (link portions) 44c of elongated shape, a connecting frame 44d, and a fixing pad portion 44e of substantially rectangular shape, the tongue portion 44a being located on a distal end side, the proximal end portion 44b being located on a proximal end side, spaced apart from the tongue portion 44a, the pair of outriggers 44c extending from the tongue portion 44a to the proximal end portion 44b and displaceably supporting the tongue portion 44a, the connecting frame 44d extending around a distal end side of the tongue portion 44a, from one outrigger 44c to the other outrigger 44c, and the fixing pad portion 44e extending from the connecting frame 44d and facing a distal end portion of the tongue portion 44a. Furthermore, the thin metal plate 46 integrally includes a pair of limiters (ramp limiters) 45 of rectangular shape that extend from the tongue portion 44a and protrude distally from the load beam 38. The limiters 45 are located on both sides of the fixing pad portion 44e. Instead of the pair of limiters 45, one or three or more of limiters 45 may be employed. Furthermore, each of the limiters 45 is not limited to the rectangular shape but can have any shape.

The proximal end portion 44b is pasted on the surface of the load beam 38 and spot-welded to the load beam 38 at the welded points B1. The fixing pad portion 44e is spot-welded to the distal end portion of the load beam 38 at the welded point B2. The tongue portion 44a is formed in a size and shape large enough to mount the magnetic head 17, for example, in a substantially rectangular shape. The tongue portion 44a is arranged so that a central axis in a width direction thereof coincides with a central axis C1 of the suspension 34. Substantially the center portion of the tongue portion 44a is in contact with a dimple (protruding portion) 52 provided at the distal end portion of the load beam 38. The tongue portion 44a is displaceable in various directions about the dimple 52 in response to resilient deformation of the pair of outriggers 44c and connecting frame 44d. Thus, the tongue portion 44a and the magnetic head 17 can flexibly follow a surface deformation of the magnetic disk 18, in a roll direction and a pitch direction, maintaining a minute gap between the surface of the magnetic disk 18 and the magnetic head 17.

In the gimbal portion 44, the laminated member 48 of the flexure 42 is partially bifurcated and is located on both sides of the central axis C1 of the suspension 34. The laminated member 48 includes a proximal end portion 48a that is fixed to the proximal end portion 44b of the thin metal plate 46, a distal end portion 48b that is pasted to the tongue portion 44a, and a pair of bridge portions 48c of strip shape that extends from the proximal end portion 48a to the distal end portion 48b. The bridge portions 48c are arranged so as to partially overlap the tongue portion 44a except for the center portion of the tongue portion 44a and is pasted to the tongue portion 44a.

The magnetic head 17 overlaps the bridge portions 48c to be fixed to the tongue portion 44a with an adhesive. The magnetic head 17 is arranged so that a longitudinal central axis thereof coincides with the central axis C1 of the suspension 34, and the magnetic head 17 has a substantially the center portion that is located on the dimple 52. In the magnetic head 17, a recording element and a reading element are electrically connected to a plurality of electrode pads 54 in the distal end portion 48b by a conductive adhesive, such as solder or silver paste. Therefore, the magnetic head 17 is connected to the signal wiring lines of the laminated member 48 via the electrode pads 54.

The pair of piezoelectric elements 50 uses, for example, a piezoelectric thin film (PZT element) of rectangular plate shape. The piezoelectric element 50 is not limited to the piezoelectric thin film (thickness of approximately 10 µm), but a bulk piezoelectric element or bulk laminated piezoelectric element (thickness of 50 µm or more) may be used. The piezoelectric element 50 is not limited to the PZT element, but another piezoelectric element may be used. Furthermore, each of the drive elements is not limited to the piezoelectric element, but another drive element that is extendable and contractable by applying current may be used.

The piezoelectric elements 50 are each arranged such that a longitudinal direction (extending and contracting direction) thereof is parallel to the central axis C1 of the load beam 38. The two piezoelectric elements 50 are arranged on both sides of the magnetic head 17 in a width direction and are arranged side by side in parallel with each other. Each of the piezoelectric elements 50 has one longitudinal end which is mounted on the distal end portion 48b and electrically connected to an electrode pad in the distal end portion 48b. Each piezoelectric element 50 has the other longitudinal end which is mounted on an intermediate portion of each bridge portion 48c and electrically connected to an electrode pad in the bridge portion 48c. Therefore, the piezoelectric elements 50 are connected to the drive wiring lines of the laminated member 48 via the electrode pads.

As illustrated in FIGS. 1 and 2, the board unit 21 integrally includes a base portion 58 of substantially rectangular shape, a relay portion 57 of elongated strip shape that extends from the base portion 58, and the wiring board 51 that is continuous with a distal end of the relay portion 57. The base portion 58, the relay portion 57, and the wiring board 51 are formed using a flexible printed wiring board (FPC). The base portion 58 is arranged on the bottom wall 12a of the base 12, and the wiring board 51 is mounted to an installation surface of the actuator block 29.

Electronic components, such as a conversion connector and a plurality of capacitors, which are not illustrated, are mounted on the base portion 58. The wiring board 51 is provided with a large number of connection pads, not illustrated. The connection end portions 42c of the flexures 42 of the suspension assemblies 30 described above are arranged to overlap the connection pads, being joined to the connection pads by, for example, soldering. Furthermore, for example, a head IC (head amplifier) 53 is mounted on the wiring board 51 and connected to the connection pads and the base portion 58 via a plurality of wiring lines, which are not illustrated. Thus, eight magnetic heads 17 of the actuator assembly 22 are electrically connected to the base portion 58 through the wiring lines of the flexure 42 and via the connection end portions 42c, the wiring board 51, the head IC 53, and the relay portion 57.

In a state where the actuator assembly 22 configured as described above is incorporated on the base 12, the support shaft 31 is stood substantially parallel to a spindle of the spindle motor 19. Each magnetic disk 18 is located between two suspension assemblies 30. During operation of the HDD, the magnetic heads 17 supported by the two suspension assemblies 30 face the upper and lower surfaces of the magnetic disk 18.

As illustrated in FIG. 1, when the HDD is not operating, the actuator assembly 22 is rotated to the unload position where each of the magnetic heads 17 is located outside the outermost circumference of each magnetic disk 18 and the actuator assembly 22 is held at the unload position by the ramp load mechanism 25.

Next, a ramp of the ramp load mechanism 25 and a positional relationship between the ramp and the suspension assembly will be described in detail.

FIG. 6 is a perspective view of the ramp of the ramp load mechanism. As illustrated in FIGS. 1 and 6, the ramp load mechanism 25 comprises the ramp 60 installed on the base 12 and the tabs 40 engageable with the ramp 60. As described above, each of the tabs 40 is provided at the distal end of the load beam 38 of each suspension assembly 30.

The ramp 60 is fixed to the bottom wall 12a of the base 12 and is located in the vicinities of the peripheral edges of the magnetic disks 18. The ramp 60 includes a ramp body 62 formed in a block shape and eight guide surfaces (guide portions) 64 formed on one side portion of the ramp body 62. The guide surfaces 64 are configured to support and guide the tabs 40 of the eight suspension assemblies 30. These guide surfaces 64 are arranged at predetermined intervals in the axial direction of the magnetic disks 18 and are arranged in accordance with the heights of the corresponding suspension assemblies 30. Each of the guide surfaces 64 extends substantially in a radial direction of each magnetic disk 18 to the vicinity of the outer peripheral edge of the magnetic disk 18 and is arranged on a movement path of each tab 40. Each guide surface 64 includes a first inclined surface 64a that is inclined toward a magnetic disk 18 to load and unload a magnetic head 17 on the magnetic disk, a flat surface 64b which is continuous from the first inclined surface 64a and extends parallel to the surface of the magnetic disk, and a second inclined surface 64c which is inclined and extend from the other end of the flat surface 64b to a terminal end of the guide surface.

The ramp 60 has four support blocks 70 protruding from one side of the ramp body 62. Each of the support blocks 70 has an elongated rectangular parallelepiped shape and is provided between two adjacent guide surfaces 64. The support blocks 70 each have an upper surface and a lower surface that extend substantially parallel to the bottom wall 12a and form support surfaces 70a. Each of the support surfaces 70a is located at a height, apart from a corresponding guide surface 64 in the axial direction.

A plurality of rectangular recesses is formed at an end of the ramp body 62 near the magnetic disks 18. Each recess is located between two vertically adjacent guide surfaces 64. In a state where the ramp 60 is installed on the base 12, the outer peripheral edges of the four magnetic disks 18 are spatially located in the corresponding recesses.

According to the HDD configured as described above, the VCM 24 turns the actuator assembly 22 around the support shaft 31, and thereby the magnetic heads 17 are moved to desired seek positions while facing the surfaces of the magnetic disks 18. When the magnetic heads 17 move out of the outer peripheries of the magnetic disks 18 and move to predetermined stop positions during non-operation of the HDD, the tabs 40 of the suspension assemblies 30 ride on the corresponding guide surfaces 64 of the ramp 60. Thus, the magnetic heads 17 are held by the ramp 60 at unload positions that are separated from the magnetic disks 18.

FIGS. 7A and 7B are schematic views of positional relationships between the ramp 60 and a suspension assembly 30 at the unload position. As illustrated in FIG. 7A, in a normal state, when a magnetic head 17 moves out of the outer periphery of a magnetic disk 18 to a predetermined stop position, a tab 40 of the suspension assembly 30 rides on the guide surface 64 of the ramp 60 and is held on the guide surface 64. Thus, the magnetic heads 17 are held by the ramp 60 at unload positions that are separated from the magnetic disks 18. Furthermore, the limiters 45 of the suspension assembly 30 face a support surface 70a of the ramp 60, spaced apart therefrom.

As illustrated in FIG. 7B, in a state where the magnetic head 17 is held at the unload position, when a large impact is applied to the HDD, displacing a tongue portion 44a and the magnetic head 17 in a direction away from a dimple 52, a pair of the limiters 45 are brought into contact against the support surface 70a of the ramp 60 and stops the displacement of the tongue portion 44a and the magnetic head 17. In other words, the limiters 45 prevent excessive displacement and deformation of the magnetic head 17 and the tongue portion 44a.

In the HDD according to the present embodiment configured as described above, a gimbal portion 44 of each suspension assembly is welded to a support plate at least at two positions of the welded points B1 located on the leading end side of the head 17 and the welded point B2 located on the trailing end side thereof, and the gimbal portion 44 includes the tongue portion 44a that is resiliently deformably provided between these welded points B1 and B2, and the limiters 45 provided at the tongue portion 44a. The limiters 45 are formed and arranged so as to make contact against a support surface 70a of the ramp 60. When an impact is applied to the HDD, the limiters 45 are brought into contact against the support surface 70a of the ramp 60 to prevent excessive displacement and deformation of the tongue portion 44a and the magnetic head 17.

From the above description, according to the present embodiment, it is possible to obtain a suspension assembly and a disk drive that prevent excessive deformation and damage and have improved reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape of the thin metal plate that constitutes the gimbal portion is not limited to the above-described embodiments but may have any shape that deformably supports the tongue portion. The limiters 45 may have a configuration in which a separate limiter is mounted to the tongue portion.

What is claimed is:

1. A disk drive comprising:
a disk-shaped recording medium including a recording layer;
a suspension assembly comprising:
a support plate including a distal end portion and a proximal end portion; a wiring member comprising a gimbal portion and provided on the support plate; and a magnetic head mounted on the gimbal portion, wherein the gimbal portion comprises a first welded portion located near the proximal end portion of the support plate and welded to the support plate, a second welded portion located near the distal end portion of the support plate and welded to the support plate, a tongue portion provided between the first welded portion and the second welded portion and supported displaceably to the support plate, and on which the magnetic head is mounted, and a limiter extending from the tongue portion toward the second welded portion;
a tab provided at the distal end portion of the support plate; and
a ramp comprising a guide surface on which the tab is placeable and a support surface against which the limiter is capable of contact.

2. The disk drive of claim 1, wherein the gimbal portion comprises a proximal end portion including the first welded portion and fixed to the support plate, a pair of link portions which are resiliently deformable, extend from the proximal end portion of the tongue portion, and displaceably support the tongue portion, a connecting frame which extends from one of the link portions to the other of the link portions through a distal end portion side of the tongue portion, and a pad portion between the connecting frame and the tongue portion, connected to the connecting frame, the pad portion including the second welded portion and being fixed to the support plate.

3. The disk drive of claim 1, wherein the tongue portion comprises two limiters extending from the tongue portion toward the second welded portion, and the second welded portion is located between the two limiters.

4. The disk drive of claim 1, further comprising an extendable piezoelectric element mounted on the gimbal portion.

5. The disk drive of claim 2, wherein the tongue portion comprises two limiters extending from the tongue portion toward the second welded portion, and the second welded portion is located between the two limiters.

* * * * *